May 19, 1931.　　W. K. TAVENDER　　1,806,004
ELECTRIC HEATER
Filed July 25, 1928
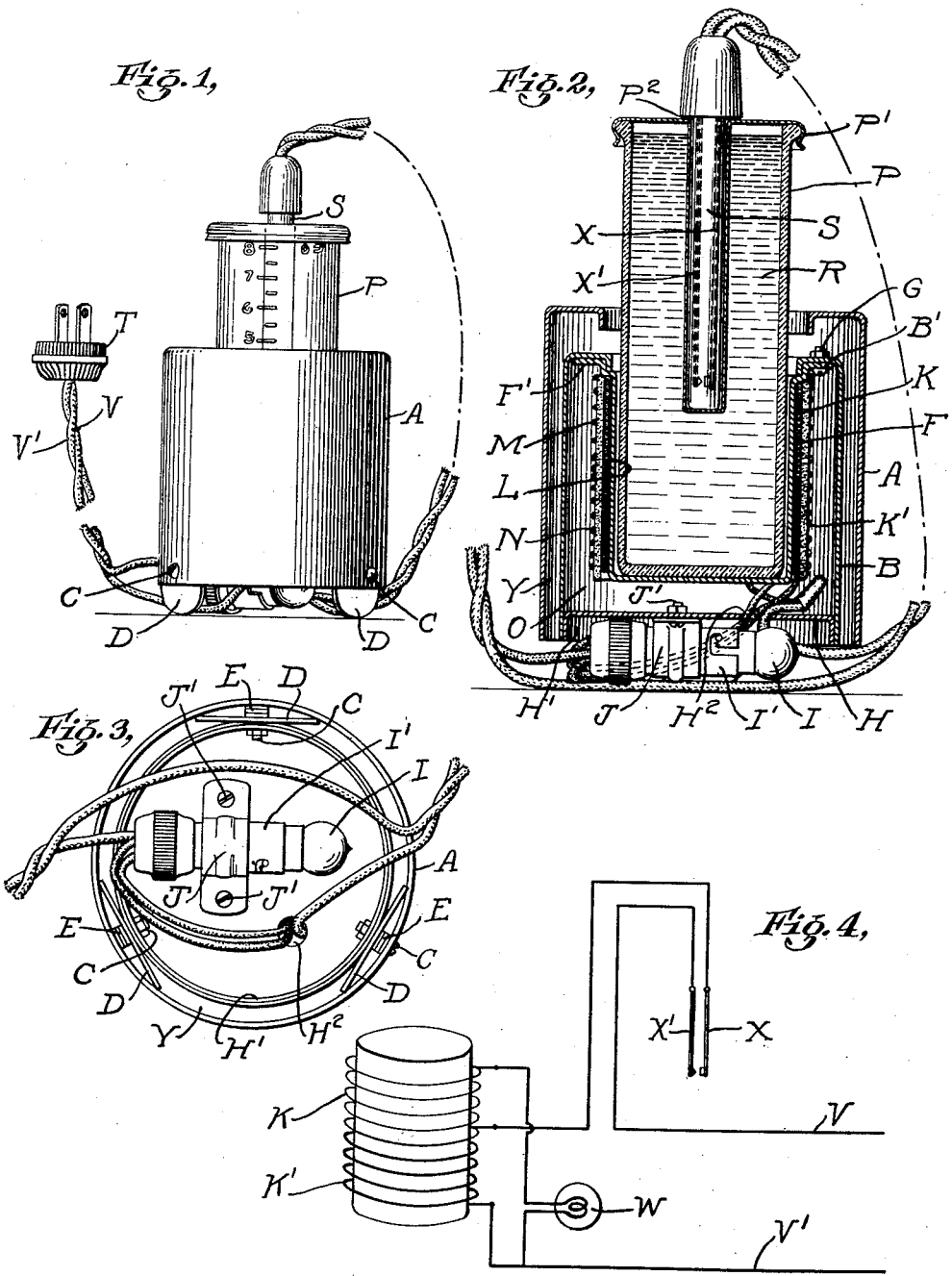
INVENTOR.
WALTER K. TAVENDER
BY Frank H. Schley
ATTORNEYS.

Patented May 19, 1931

1,806,004

UNITED STATES PATENT OFFICE

WALTER K. TAVENDER, OF HAWORTH, NEW JERSEY

ELECTRIC HEATER

Application filed July 25, 1928. Serial No. 295,323.

My invention relates to electric heaters.

The object of my invention is to provide a portable electric heater having a chamber in which a receptacle may be placed and the contents thereof heated to a predetermined temperature; and also a means for automatically cutting off the electric current when the temperature has reached the desired degree. Another object is to provide a visible signal to indicate when the current is cut out.

In the present form the device is shown as made for use in heating milk for infants.

Referring to the drawings forming a part of this specification:

Fig. 1 is an exterior elevational view of a heater embodying my invention.

Fig. 2 is a vertical sectional view thereof.

Fig. 3 is an inverted plan view.

Fig. 4 is a diagrammatic view illustrating the electric circuits, and thermostatic switch control device, used for cutting off the electric current.

A indicates an outer shell portion of cylindrical form which is open to the atmosphere at the upper and lower ends, for the passage of air therethrough.

B indicates a cylindrical casing which is joined to the outer casing or shell portion by a screw and nut construction C. C. C. respectively, which pass through holes formed in the casing portions and through discs D. D. D. respectively, which serve to space the casings from each other and also serve as legs to support the device at a proper distance above the surface on which the device stands. E. E., etc. indicate washers carried on the screws between the outer shell and inner casing to provide firm joints between the united parts.

The top end of the casing B, is turned inwardly to form a circular flange B', from which is suspended a cup F, which is supplied with a circular flange F', which extends outwardly under the flange B, and the flanges are connected together by nut and screw elements G. The casing B, is provided with a bottom plate H, which is held in position by the screws C, which pass through holes formed in the flange portion H', as illustrated in Fig. 3. The bottom plate H, is provided with a hole $H^2$, to permit electric conductors to extend therethru. I, indicates a light bulb which is held in a socket construction L', and said socket construction is held my a clamp J, to the underside of the bottom plate H, by screws J'.

The heating elements consist of resistance wires K, and K', which are wound over a sheet of insulating material L, such as, mica, which is formed into cylindrical shape and held to the outer surface of the cup F, by the heating elements wound thereon. A cylinder of asbestos M, is held in overlying relation to the heating elements wound thereon.

A cylinder of asbestos M, is held in overlying relation to the heating elements by a coil of wire indicated by N. The heating elements and insulation therefor are secured to the cup F, prior to placing the bottom H, in position, and are made interchangeable so that should a heating element burn out or break a new cup with the heaters assembled thereon may be available for replacement. The cup is separated from the inner wall of the casing B, to provide a closed chamber O, which serves as a heat insulating chamber. P, indicates a container of glass or other suitable material for holding the fluid to be heated and which may be set in the cup F, as illustrated. R, indicates the fluid to be heated, and P' indicates a cover for the container which is provided with a hole $P^2$ thru which extends a casing S, containing a bimetallic thermostat, and electric switch of the usual type. T, indicates a terminal connecting plug, and U, and U' the lead wires. The upper coil K, of the heater is wound to use 40 watts, and the lower coil K', is wound to use 70 watts, the voltage being 110 on the lead wires. A two candle power lamp W, is connected in shunt circuit as illustrated in Fig. 4. X and X', indicate the thermostat switch which is normally closed, but opens and cuts off the current when the temperature of the fluid R, is raised to the degree set for the thermostat to operate. During the heating operation the lamp I, is lighted, so that it may be used as a signal which indicates when the fluid has been properly heated, as it is then cut out by the action of the thermostat switch.

The device is simple and efficient in its operation.

Having thus described my invention, I claim as new:

1. An electric heater of the character described comprising an inner and outer casing, means comprising discs for holding said casings together in spaced relation which project below said casings to serve as legs therefor and to provide an annular passage for air therebetween, a cup suspended from the upper end of said inner casing, a plurality of heating elements of relatively different heating capacity carried thereby, and electrical conductors connected to said heating elements and adapted to establish an electric circuit thru each of same.

2. An electric heater of the character described, comprising an outer casing and an inner casing spaced therefrom providing an air passage therebetween, supporting feet for the heater positioned between the casing walls to maintain them in spaced relation and connect them together, a cup suspended from the upper end of the inner casing with an electric resistance wound on the outer side of the cup, a source of electric energy in communication with the resistance and the outer casing being open at its upper end to permit insertion of a fluid containing receptacle in the cup.

3. An electric heater of the character described, comprising spaced inner and outer casing walls forming a passage open at opposite ends, a bottom plate in the inner casing, means connecting the bottom plate and casing walls and forming depending supporting feet for the heater, a cup within the inner casing, cooperating flanges on the upper ends of the inner wall and cup for the support of the latter, a heating element inclosing the cup and said cup adapted to receive a fluid containing receptacle that extends above the heater for heating the fluid contents thereof.

4. An electric heater of the character described, comprising spaced inner and outer casing walls forming a passage open at opposite ends, a bottom plate in the inner casing, means connecting the bottom plate and casing walls and forming depending supporting feet for the heater, a cup within the inner casing, cooperating flanges on the upper ends of the inner wall and cup for the support of the latter, a heating element inclosing the cup and said cup adapted to receive a fluid containing receptacle that extends above the heater for heating the fluid contents thereof, the outer casing wall having an inwardly directed flange at its upper end terminating outwardly of the upper end of the cup.

5. An electric heater of the character described, comprising a casing embodying an outer wall having a bottom and a cup within the wall attached at its upper end to the upper end of the wall and spaced from the bottom, a resistance coil wound on the cup, a source of electric energy in communication with the resistance coil and an inclosing shell for the casing spaced therefrom and open at the top and bottom ends thereof.

6. An electric heater of the character described, comprising a casing embodying an outer wall having a bottom and a cup within the wall attached at its upper end to the upper end of the wall and spaced from the bottom, a resistance coil wound on the cup, a source of electric energy in communication with the resistance coil and an inclosing shell for the casing spaced therefrom and open at the top and bottom ends thereof, and supporting feet for the heater embodying parts positioned between and connected to the lower ends of the casing and shell and spacing the shell from the casing.

In testimony whereof I have affixed my signature.

WALTER K. TAVENDER.